(12) United States Patent
Lee et al.

(10) Patent No.: US 10,432,950 B2
(45) Date of Patent: *Oct. 1, 2019

(54) IMAGE ENCODING/DECODING METHOD AND DEVICE

(71) Applicant: ELECTRONICS AND TELECOMMUNICATIONS RESEARCH INSTITUTE, Daejeon (KR)

(72) Inventors: Ha Hyun Lee, Seoul (KR); Jung Won Kang, Daejeon (KR); Jin Ho Lee, Daejeon (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/875,148

(22) Filed: Jan. 19, 2018

(65) Prior Publication Data

US 2018/0160131 A1   Jun. 7, 2018

Related U.S. Application Data

(63) Continuation of application No. 14/782,213, filed as application No. PCT/KR2014/002899 on Apr. 3, 2014, now Pat. No. 9,924,180.

(30) Foreign Application Priority Data

Apr. 4, 2013   (KR) .................. 10-2013-0037106
Apr. 10, 2013  (KR) .................. 10-2013-0039356
(Continued)

(51) Int. Cl.
*H04N 19/187*  (2014.01)
*H04N 19/176*  (2014.01)
(Continued)

(52) U.S. Cl.
CPC ......... *H04N 19/187* (2014.11); *H04N 19/105* (2014.11); *H04N 19/176* (2014.11);
(Continued)

(58) Field of Classification Search
CPC ...... H04N 19/61; H04N 19/13; H04N 19/187; H04N 19/17; H04N 19/50; H04N 19/503; H04N 19/176; H04N 19/36; H04N 19/44
See application file for complete search history.

(56) References Cited

U.S. PATENT DOCUMENTS

2006/0029134 A1   2/2006   Winder et al.
2006/0083308 A1   4/2006   Schwarz et al.
(Continued)

FOREIGN PATENT DOCUMENTS

KR   10-2007-0074452 A   7/2007
KR   10-2011-0052203 A   5/2011
(Continued)

OTHER PUBLICATIONS

International Search Report issued on Jun. 26, 2014, in counterpart International Patent Application No. PCT/KR2014/002899 (4 pages in English and 5 pages in Korean).
(Continued)

*Primary Examiner* — Jingge Wu
(74) *Attorney, Agent, or Firm* — NSIP Law

(57) ABSTRACT

Disclosed are a method and an apparatus for image encoding/decoding that support a plurality of layers. The method for image decoding that supports a plurality of layers includes decoding information of a first layer which a picture of a second layer including a current decoding target block refers to; mapping the information of the first layer to a picture size of the second layer, configuring a reference picture list for the picture of the second layer by adding the mapped information of the first layer and generating pre-
(Continued)

diction samples of the current decoding target block by predicting the current decoding target block of the second layer based on the reference picture list, and the information of the first layer includes at least one of a sample value and motion information of the first layer picture.

19 Claims, 6 Drawing Sheets

(30) Foreign Application Priority Data

| | | | |
|---|---|---|---|
| Jul. 10, 2013 | (KR) | ................ | 10-2013-0081199 |
| Jul. 15, 2013 | (KR) | ................ | 10-2013-0082577 |
| Apr. 3, 2014 | (KR) | ................ | 10-2014-0039805 |

(51) Int. Cl.
    *H04N 19/105*      (2014.01)
    *H04N 19/52*      (2014.01)
    *H04N 19/70*      (2014.01)
    *H04N 19/463*      (2014.01)
    *H04N 19/33*      (2014.01)
    *H04N 19/31*      (2014.01)

(52) U.S. Cl.
    CPC ............ *H04N 19/31* (2014.11); *H04N 19/33* (2014.11); *H04N 19/463* (2014.11); *H04N 19/52* (2014.11); *H04N 19/70* (2014.11)

(56) References Cited

U.S. PATENT DOCUMENTS

| | | |
|---|---|---|
| 2007/0189382 A1 | 8/2007 | Park et al. |
| 2008/0260034 A1 | 10/2008 | Wang et al. |
| 2009/0060034 A1 | 3/2009 | Park et al. |
| 2009/0097558 A1 | 4/2009 | Ye et al. |
| 2011/0110426 A1 | 5/2011 | Kim et al. |
| 2011/0222837 A1* | 9/2011 | Walton ............... H04N 5/783 386/347 |
| 2011/0293013 A1 | 12/2011 | Ma et al. |
| 2012/0183059 A1 | 7/2012 | Nishi et al. |
| 2012/0189053 A1* | 7/2012 | Chen ............... H04N 19/105 375/240.12 |
| 2013/0272411 A1 | 10/2013 | Tu et al. |
| 2013/0308704 A1 | 11/2013 | Park et al. |
| 2013/0336394 A1 | 12/2013 | Tu et al. |
| 2013/0336403 A1* | 12/2013 | Naing ............... H04N 19/52 375/240.16 |
| 2014/0016694 A1 | 1/2014 | Boyce et al. |
| 2014/0044179 A1 | 2/2014 | Li et al. |
| 2014/0072031 A1* | 3/2014 | Xiu ............... H04N 19/105 375/240.02 |
| 2014/0086328 A1 | 3/2014 | Chen et al. |
| 2014/0092977 A1 | 4/2014 | Lainema et al. |
| 2014/0119440 A1 | 5/2014 | Lee et al. |
| 2014/0119441 A1 | 5/2014 | Lee et al. |
| 2014/0161187 A1 | 6/2014 | Zhang et al. |
| 2014/0177711 A1 | 6/2014 | Kang et al. |
| 2014/0192885 A1 | 7/2014 | Seregin et al. |
| 2014/0198181 A1 | 7/2014 | Chen et al. |
| 2014/0218473 A1 | 8/2014 | Hammuksela et al. |
| 2014/0247883 A1 | 9/2014 | Lee et al. |
| 2014/0254681 A1 | 9/2014 | Aminlou et al. |
| 2014/0286415 A1 | 9/2014 | Kang et al. |
| 2014/0294062 A1 | 10/2014 | Chen et al. |
| 2014/0301456 A1 | 10/2014 | Wang et al. |
| 2014/0301463 A1 | 10/2014 | Rusanovskyy et al. |
| 2014/0321560 A1 | 10/2014 | Ugur et al. |
| 2014/0348241 A1 | 11/2014 | Lim et al. |
| 2015/0049806 A1 | 2/2015 | Choi et al. |
| 2015/0049812 A1 | 2/2015 | Ovsyannikov et al. |
| 2015/0103897 A1* | 4/2015 | Kim ............... H04N 19/573 375/240.12 |
| 2015/0229967 A1 | 8/2015 | Lee |
| 2015/0264384 A1 | 9/2015 | Choi et al. |
| 2016/0014432 A1 | 1/2016 | Park et al. |
| 2016/0191942 A1* | 6/2016 | Oh ............... H04N 19/105 375/240.16 |
| 2018/0146200 A1* | 5/2018 | Lee ............... H04N 19/187 |

FOREIGN PATENT DOCUMENTS

| | | |
|---|---|---|
| KR | 10-2013-0000334 A | 1/2013 |
| KR | 10-2013-0037193 A | 4/2013 |
| WO | WO 2007/081140 A1 | 7/2007 |
| WO | WO 2012/108700 A2 | 8/2012 |

OTHER PUBLICATIONS

Written Opinion of the International Searching Authority dated Jun. 26, 2014, in counterpart International Patent Application No. PCT/KR2014/002899 (9 pages in English and 7 pages in Korean).

U.S. Appl. No. 14/782,213, filed Oct. 2, 2015, Ha Hyun Lee et al., Electronics and Telecommunications Research Institute.

U.S. Appl. No. 15/875,173, filed Jan. 19, 2018, Ha Hyun Lee et al., Electronics and Telecommunications Research Institute.

U.S. Appl. No. 15/875,258, filed Jan. 19, 2018, Ha Hyun Lee et al., Electronics and Telecommunications Research Institute.

U.S. Appl. No. 15/875,293, filed Jan. 19, 2018, Ha Hyun Lee et al., Electronics and Telecommunications Research Institute.

* cited by examiner

16 X 16 UNIT BLOCKS OF SECOND LAYER PICTURE

IMAGE ENCODING/DECODING METHOD AND DEVICE

CROSS-REFERENCE TO RELATED APPLICATIONS

This application is a continuation of application Ser. No. 14/782,213 filed on Oct. 2, 2015, which is a U.S. national stage application of International Application No. PCT/KR2014/002899 filed on Apr. 3, 2014, which claims the benefit under 35 USC 119(a) and 365(b) of Korean Patent Application Nos. 10-2013-0037106 filed on Apr. 4, 2013, 10-2013-0039356 filed on Apr. 10, 2013, 10-2013-0081199 filed on Jul. 10, 2013, 10-2013-0082577 filed on Jul. 15, 2013, and 10-2014-0039805 filed on Apr. 3, 2014, in the Korean Intellectual Property Office. The entire disclosures of application Ser. No. 14/782,213, International Application No. PCT/KR2014/002899, and Korean Patent Application Nos. 10-2013-0037106, 10-2013-0039356, 10-2013-0081199, 10-2013-0082577, and 10-2014-0039805 are incorporated herein by reference for all purposes.

BACKGROUND

1. Field

The present invention relates to image encoding and decoding, and more particularly, to a method for predicting, and encoding and decoding an image of a higher layer by using information of a lower layer in image encoding and decoding in a multi-layer structure.

2. Description of Related Art

In recent years, while a multimedia environment has been built up, various terminals and networks have been used and the resulting use requirement has been diversified.

For example, as a performance and a computing capability of a terminal have been diversified, a supported performance has also been diversified for each apparatus. Further, in the case of a network in which information is transmitted, a pattern, an information amount, and a transmission speed of the transmitted information, as well as an external structure such as wired and wireless networks have been diversified for each function. A user has selected a terminal and a network to be used according to a desired function and further, spectrums of a terminal and a network which an enterprise provides to the user have been diversified.

In this regard, in recent years, as a broadcast having a high definition (HD) resolution has been extended and serviced worldwide as well as domestically, a lot of users have been familiar with a high definition image. As a result, a lot of image service associated organizations have made a lot of efforts to develop a next-generation image apparatus.

Further, with an increase in interest in ultra high definition (UHD) having four times higher resolution than an HDTV as well as the HDTV, a requirement for technology that compresses and processes a higher resolution and higher definition image has been further increased.

In order to compress and process the image, inter prediction technology of predicting a pixel value included in a current image from a temporally prior and/or post image, intra prediction technology of predicting another pixel value included in the current image by using pixel information in the current image, and entropy encoding technology of allocating a short sign to a symbol in which an appearance frequency is high and a long sign to a symbol in which the appearance frequency is low, and the like may be used.

As described above, when respective terminals and networks having different supported functions, and the diversified user requirements are considered, a quality, a size, a frame, and the like of a supported image need to be consequently diversified.

As such, due to heterogeneous communication networks, and terminals having various functions and various types of terminals, scalability that variously supports the quality, resolution, size, frame rate, and the like of the image becomes a primary function of a video format.

Accordingly, it is necessary to provide a scalability function so as to achieve video encoding and decoding in terms of time, space, image quality, and the like in order to provide a service required by the user under various environments based on a high-efficiency video encoding method.

SUMMARY

An object of the present invention is to provide a method and an apparatus for encoding/decoding a higher layer by using information of a lower layer in scalable video coding.

Another object of the present invention is to provide a method and an apparatus for mapping a lower layer image in scalable video coding.

Yet another object of the present invention is to provide a method and an apparatus for configuring a reference picture list of a higher layer image by using a lower layer image and performing a prediction in scalable video coding.

In accordance with an aspect of the present invention, there is provided a method for image decoding supporting a plurality of layers. The method for image decoding includes decoding information of a first layer which a picture of a second layer including a current decoding target block refers to; mapping the information of the first layer to a picture size of the second layer, configuring a reference picture list for the picture of the second layer by adding the mapped information of the first layer and generating prediction samples of the current decoding target block by predicting the current decoding target block of the second layer based on the reference picture list.

The information of the first layer may include at least one of a sample value and motion information of the first layer picture.

In accordance with another aspect of the present invention, there is provided an apparatus for image decoding supporting a plurality of layers. The apparatus for image decoding includes a decoding module which decodes information of a first layer which a picture of a second layer including a current encoding target block refers to and a prediction module which maps the information of the first layer to a picture size of the second layer, configures a reference picture list for the picture of the second layer by adding the mapped information of the first layer, and generates prediction samples of the current decoding target block by predicting the current decoding target block of the second layer based on the reference picture list.

The information of the first layer may include at least one of a sample value and motion information of the first layer picture.

In accordance with yet another aspect of the present invention, there is provided a method for image encoding supporting a plurality of layers. The method for image encoding includes decoding information of a first layer which a picture of a second layer including a current encoding target block refers to, mapping the information of the first layer to a picture size of the second layer, configuring a reference picture list for the picture of the second layer by adding the mapped information of the first layer and generating prediction samples of the current encoding target block by predicting the current encoding target block of the second layer based on the reference picture list.

The information of the first layer may include at least one of a sample value and motion information of the first layer picture.

In accordance with still another aspect of the present invention, there is provided an apparatus for image encoding supporting a plurality of layers. The apparatus for image encoding includes an encoding module which decodes information of a first layer which a picture of a second layer including a current encoding target block refers to and a prediction module which maps the information of the first layer to a picture size of the second layer, configures a reference picture list for the picture of the second layer by adding the mapped information of the first layer, and generates prediction samples of the current encoding target block by predicting the current encoding target block of the second layer based on the reference picture list.

The information of the first layer may include at least one of a sample value and motion information of the first layer picture.

In the related art, during mapping motion information of a lower layer, even when a temporal motion vector of a higher layer is not predicted, there is a problem that an unnecessary motion information mapping process is performed. Further, when the motion information of the lower layer is not mapped, since a decoded picture of the lower layer can be indicated as a collocated picture for the temporal motion vector in the upper layer, a case in which the temporal motion vector of the upper layer cannot be predicted occurs, thereby degrading encoding efficiency.

According to the present invention, the motion information of the lower layer to which the upper layer refers is mapped in an image size of the upper layer and thereafter, the upper layer is predicted and reconstructed by using an image signal of the lower layer which is mapped, thereby improving encoding/decoding efficiency. Further, by modifying an upper level syntax, an unnecessary mapping process of the motion information of the lower layer can be skipped and complexity can be reduced. In addition, a wrong collocated picture is prevented from being used to prevent the encoding efficiency from being degraded.

DETAILED DESCRIPTION

Hereinafter, embodiments of the present invention will be described in detail with reference to the accompanying drawings. In describing the embodiments of the present specification, when it is determined that the detailed description of the known art related to the present invention may obscure the gist of the present invention, the corresponding description thereof may be omitted.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Moreover, a content of describing "including" a specific component in the specification does not exclude a component other than the corresponding component and means that an additional component may be included in the embodiments of the present invention or the scope of the technical spirit of the present invention.

Terms such first, second, and the like may be used to describe various components, but the components are not limited by the terms. The above terms are used only to discriminate one component from the other component. For example, without departing from the scope of the present invention, a first component may be referred to as a second component, and similarly, a second component may be referred to as a first component.

Further, components described in the embodiments of the present invention are independently illustrated in order to show different characteristic functions and each component is not constituted by separated hardware or one software constituting unit. That is, each component includes respective components which are arranged for easy description and at least two components of the respective components may constitute one component or one component is divided into a plurality of components which may perform their functions. Even an integrated embodiment and separated embodiments of each component is also included in the scope of the present invention without departing from the spirit of the present invention.

Further, some components are not requisite components that perform essential functions but selective components for just improving performance in the present invention. The present invention may be implemented with the requisite component for implementing the spirit of the present invention other than the component used to just improve the performance and a structure including only the requisite component other than the selective component used to just improve the performance is also included in the scope of the present invention.

Figure 1:
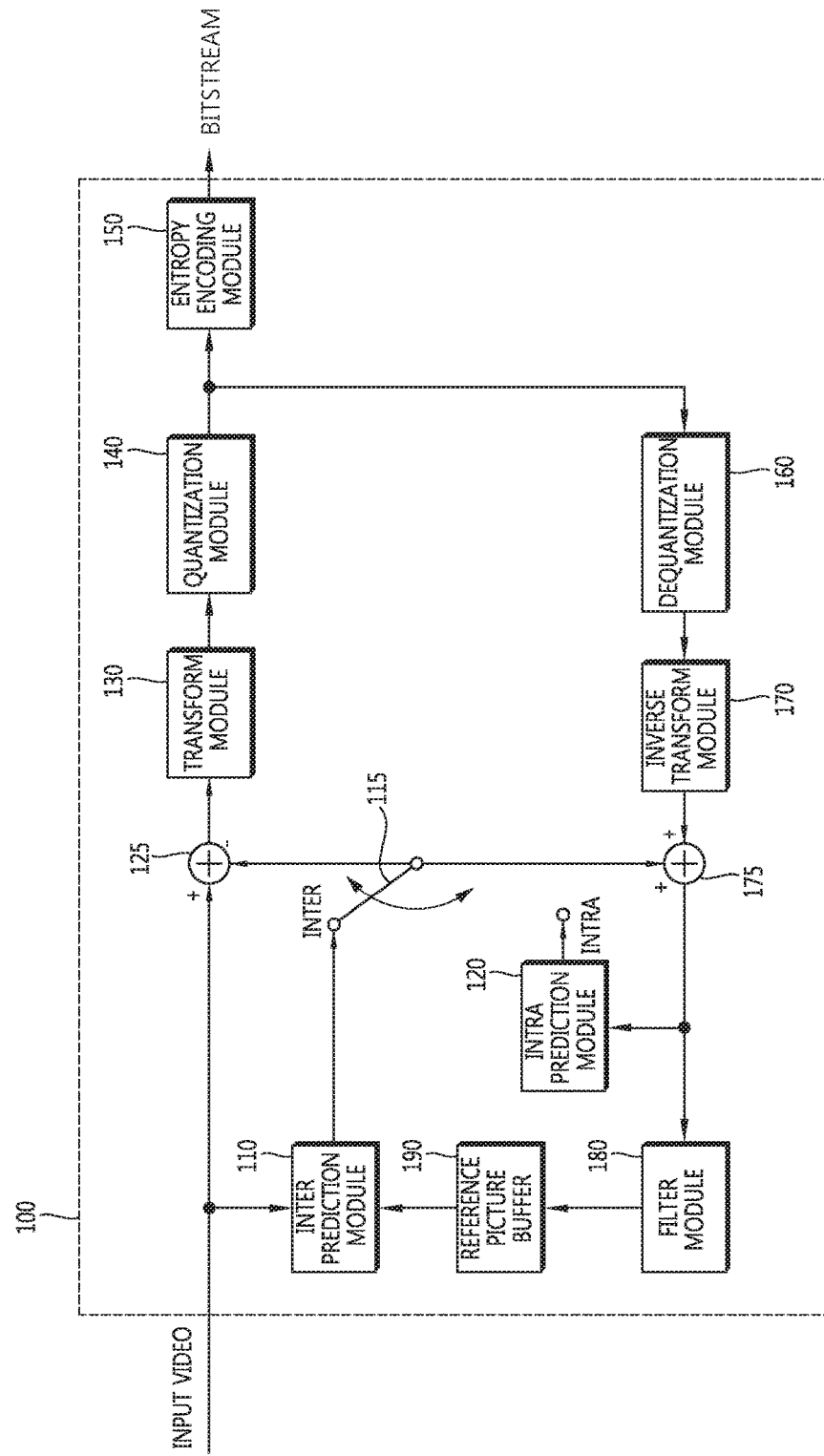
FIG. 1 is a block diagram illustrating a configuration of an apparatus for image encoding in accordance with an embodiment of the present invention.

FIG. 1 is a block diagram illustrating a configuration of an apparatus for image encoding apparatus according to an embodiment of the present invention.

A scalable video encoding apparatus that supports a multi-layer structure may be implemented by extending a general image encoding apparatus having a single-layer structure. The block diagram of FIG. 1 illustrates an embodiment of an image encoding apparatus which may be a basis of the scalable video encoding apparatus which may be applied to the multi-layer structure.

Referring to FIG. 1, an image encoding apparatus 100 includes an inter prediction module 110, an intra prediction module 120, a switch 115, a subtractor 125, a transform module 130, a quantization module 140, an entropy encoding module 150, a dequantization module 160, an inverse transform module 170, an adder 175, a filter module 180, and a reference picture buffer 190.

The image encoding apparatus 100 may encode an input image in an intra mode or an inter mode and output a bitstream.

In the intra mode, the switch 115 may be switched to intra and in the inter mode, the switch 115 may be switched to inter. The intra prediction means an intra-screen prediction and the inter prediction means an inter-screen prediction. The image encoding apparatus 100 may generate a prediction block for an input block of the input image and thereafter, encode a residual between the input block and the prediction block. In this case, the input image may mean an original picture.

In the intra mode, the intra prediction module 120 may generate the prediction block by performing a spatial prediction by using a pixel value of an already encoded/decoded block adjacent to a current block. The intra prediction module 120 may perform the spatial prediction by using a reference sample and generate prediction samples for the current block.

In the inter mode, the inter prediction module 110 may acquire a motion vector by finding an area of a reference image stored in the reference picture buffer 190 which most matches the input block during a motion prediction process. The inter prediction module 110 corrects a motion by using the motion vector and the reference image stored in the picture buffer 190 to generate the prediction block for the current block.

In case of the multi-layer structure, the inter prediction applied in the inter mode may include an inter-layer prediction. The inter prediction module 110 configures an inter-layer reference picture by sampling a picture of the reference layer and encapsulates the inter-layer reference picture in the reference picture list to perform the inter-layer prediction. An inter-layer reference relationship may be signaled through information that specifies inter-layer dependence.

Meanwhile, when a current layer picture and the reference layer picture have the same size, sampling applied to the reference layer picture may mean generation of a reference sample by sample copying or interpolation from the reference layer picture. When the current layer picture and the reference layer picture have different resolutions, the sampling applied to the reference layer picture may mean up sampling.

For example, as a case in which layers have different resolutions, the inter-layer reference picture may be configured by up-sampling the reconstructed picture of the reference layer between layers that support scalability regarding the resolution.

A layer picture used for configuring the inter-layer reference picture may be determined by considering encoding cost, and the like. The encoding apparatus may transmit, to the decoding apparatus, information that specifies the layer to which the picture to be used as the inter-layer reference picture belongs.

Further, a picture used to predict the current within a layer which is referred to in the inter-layer prediction, that is, the reference layer may be a picture of the same access unit (AU) as the current picture (a prediction target picture within the current layer).

The subtractor 125 may a residual block by a residual between the input block and the generated prediction block.

The transform module 130 transforms the residual block to output a transform coefficient. Herein, the transform coefficient may mean a coefficient value generated by converting the residual block and/or a residual signal. Hereinafter, in this specification, the transform coefficient is quantized and a quantized transform coefficient level may also be called the transform coefficient.

When a transform skip mode is applied, the transform module 130 may skip transforming the residual block.

The quantization module 140 quantizes an input transform coefficient according to a quantization parameter to output a quantized coefficient. The quantized coefficient may be called the quantized transform coefficient level. In this case, the quantization module 140 may quantize the input transform coefficient by using a quantization matrix.

The entropy encoding module 150 performs entropy encoding based on values calculated by the quantization module 140 or an encoded parameter value calculated during encoding to output the bitstream. The entropy encoding module 150 may entropy-encode information (for example, a syntax element, and the like) for video encoding in addition to pixel information of a video.

The coding parameter is a parameter required for encoding and decoding, and may include information encoded in the encoding apparatus to be transferred to the decoding apparatus like the syntax element and information to be inferred during the encoding or decoding process.

The coding parameter may include values or statistics of for example, an intra/inter prediction mode, a movement/motion vector, a reference video index, an encoding block pattern, presence of a residual signal, a transform coefficient, a quantized transform coefficient, a quantization parameter, a block size, block segment information, and the like.

The residual signal may mean a difference between an original signal and a prediction signal, and may also mean a signal having a transformed form of the difference between the original signal and the prediction signal or a signal having a transformed and quantized form of the difference between the original signal and the prediction signal. The residual signal may be referred to as a residual block in a block unit.

In the case where the entropy encoding is applied, a few of bits are allocated to a symbol having high occurrence probability and a lot of bits are allocated to a symbol having low occurrence probability to express the symbols, and as a result, a size of a bitstream for encoding target symbols may be reduced. Accordingly, compression performance of video encoding may be enhanced through the entropy encoding.

The entropy encoding module 150 may use encoding methods such as exponential-Golomb coding, context-adaptive variable length coding (CAVLC), and context-adaptive binary arithmetic coding (CABAC) for the entropy encoding. For example, the entropy encoding module 150 may perform entropy encoding by using a variable length coding/code (VLC) table. Further, the entropy encoding module 150 derives a binarization method of a target symbol and a probability model of a target symbol/bin, and then may also perform the entropy encoding by using the derived binarization method or probability model.

Since the image encoding apparatus 100 according to the embodiment of FIG. 1 performs inter prediction encoding, that is, inter-screen prediction encoding, a currently encoded image needs to be decoded and stored to be used as the reference image. Accordingly, the quantized coefficient may be inversely quantized in the dequantization module 160 and inversely transformed in the inverse transform module 170. The inversely quantized and inversely transformed coefficient is added to the prediction block by the adder 175 and a reconstructed block is generated.

The reconstructed block passes though the filter module 180, and the filter module 180 may apply at least one of a deblocking filter, a sample adaptive offset (SAO), and an adaptive loop filter (ALF) to the reconstructed block or a reconstructed picture. The filter module 180 may be called an adaptive in-loop filter. The deblocking filter may remove block distortion which occurs on a boundary between blocks. The SAO may add an appropriate offset value to a pixel value in order to compensate for coding error. The ALF may perform filtering based on a value acquired by comparing the reconstructed image and the original image. The reconstructed block which passes through the filter module 180 may be stored in the reference picture buffer 190.

Figure 2:
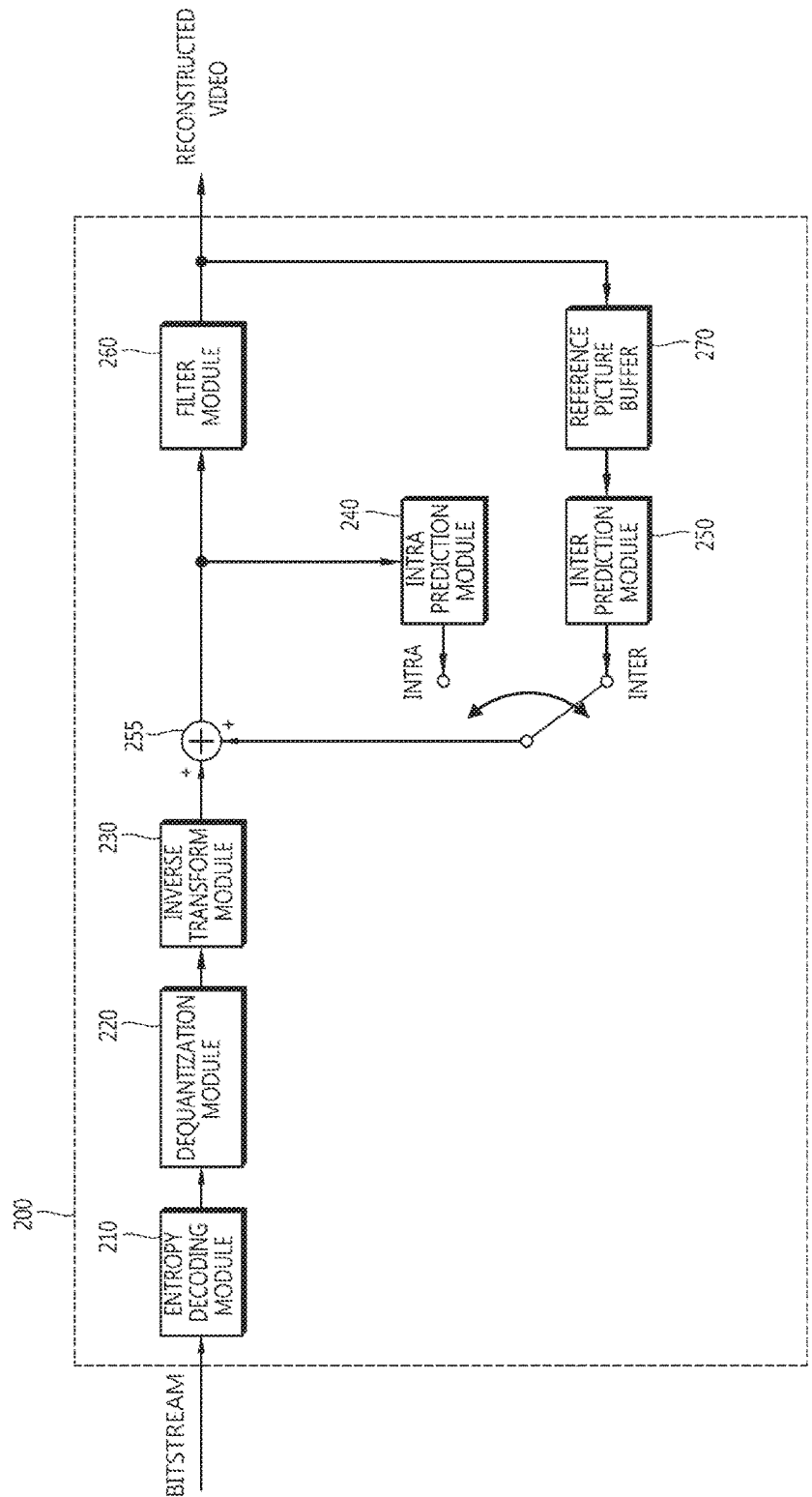
FIG. 2 is a block diagram illustrating a configuration of an apparatus for image decoding in accordance with an embodiment of the present invention.

FIG. 2 is a block diagram illustrating a configuration of an image decoding apparatus according to an embodiment of the present invention.

A scalable video decoding apparatus that supports the multi-layer structure may be implemented by extending a general image decoding apparatus having the single-layer structure. The block diagram of FIG. 2 illustrates an embodiment of an image decoding apparatus which may be a basis of the scalable video decoding apparatus which may be applied to the multi-layer structure.

Referring to FIG. 2, an image decoding apparatus 200 includes an entropy decoding module 210, a dequantization module 220, an inverse transform module 230, an intra prediction module 240, an inter prediction module 250, an adder 255, a filter module 260, and a reference picture buffer 270.

The image decoding apparatus 200 may receive a bitstream output by an encoder, decode the received bitstream in the intra mode or the inter mode, and output the reconstructed image, that is, the reconstructed image.

In the intra mode, the switch may be switched to 'intra', and in the inter mode, the switch may be switched to 'inter'.

The image decoding apparatus 200 may acquire a reconstructed residual block from the received bitstream and generate a block reconstructed by adding the reconstructed residual block and the prediction block after generating the prediction block, that is, the reconstruction block.

The entropy decoding module 210 entropy-decodes the input bitstream according to probability distribution to generate information such as a quantized coefficient and a syntax element.

The quantized coefficient is inversely quantized by the dequantization module 220 and inversely transformed by the inverse transform module 230. The quantized coefficient is inversely quantized/inversely transformed, and as a result, the reconstructed residual block may be generated. In this case, the dequantization module 220 may apply a quantization matrix to the quantized coefficient.

In the intra mode, the intra prediction module 240 may performs a spatial prediction and generate prediction samples for the current block by using a sample value of an already decoded block adjacent to the current block.

In the inter mode, the inter prediction module 250 compensates for a motion by using a motion vector and a reference picture stored in the reference picture buffer 270 to generate the prediction block for the current block.

In case of the multi-layer structure, the inter prediction applied in the inter mode may include the inter-layer prediction. The inter prediction module 250 configures an inter-layer reference picture by sampling a picture of the reference layer and encapsulates the inter-layer reference picture in the reference picture list to perform the inter-layer prediction. An inter-layer reference relationship may be signaled through information that specifies inter-layer dependence.

Meanwhile, when a current layer picture and the reference layer picture have the same size, sampling applied to the reference layer picture may mean generation of a reference sample by sample copying or interpolation from the reference layer picture. When the current layer picture and the reference layer picture have different resolutions, the sampling applied to the reference layer picture may mean up sampling.

For example, as a case in which layers have different resolutions, the inter-layer prediction is applied between the layers that supports scalability regarding the resolution, the inter-layer reference picture may be configured by up-sampling the reconstructed picture of the reference layer.

In this case, information that specifies the layer to which the picture to be used as the inter-layer reference picture belongs may be transmitted from the encoding apparatus to the decoding apparatus.

Further, a picture used to predict the current within a layer which is referred to in the inter-layer prediction, that is, the reference layer may be a picture of the same access unit (AU) as the current picture (a prediction target picture within the current layer).

The reconstructed residual block and the prediction block are added by the adder 255, and as a result, the reconstructed block may be generated. In other words, a residual sample and a prediction sample are added to each other, and as a result, a reconstructed sample or a reconstructed picture is generated.

The reconstructed picture is filtered by the filter module 260. The filter module 260 may apply at least one of a deblocking filter, an SAO, and an ALF to the reconstructed block or the reconstructed picture. The filter module 260 outputs a modified or filtered reconstructed picture. The reconstructed image is stored in the reference picture buffer 270 to be used in the inter prediction.

Further, the video decoding apparatus 200 may further include a parsing unit (not illustrated) parsing information regarding the encoded video included in the bitstream. The parsing unit may include the entropy decoding module 210, and may also be included in the entropy decoding module 210. The parsing unit may also be implemented as one constituent element of the decoding unit.

Although it has been described that one encoding apparatus/decoding apparatus processes encoding/decoding of multi-layers in FIGS. 1 and 2, it is for easy description and the encoding apparatus/decoding apparatus may be configured for each layer.

In this case, the encoding apparatus/decoding apparatus of a higher layer may perform encoding/decoding of the corresponding higher layer by using information of the higher layer and information of the higher layer. For example, the prediction unit (inter prediction unit) of the higher layer may perform the intra-prediction or inter-prediction for the current block by using pixel information or picture information of the higher layer, and perform the inter-prediction (inter-layer prediction) of the current block by receiving the reconstructed picture information from the lower layer and using the same. Herein, only the inter-layer prediction has been described as an example, but the encoding apparatus/decoding apparatus may perform encoding/decoding for a current layer by using information of a different layer regardless of the encoding apparatus/decoding apparatus being configured for each layer or one apparatus processing the multi-layers.

In the present invention, the layer may include a view. In this case, the prediction of the higher layer is not just performed by using the information of the lower layer, but the inter-layer prediction may be performed by using information of a different layer among layers that are specified to be dependent by information that specifies inter-layer dependence.

Figure 3:
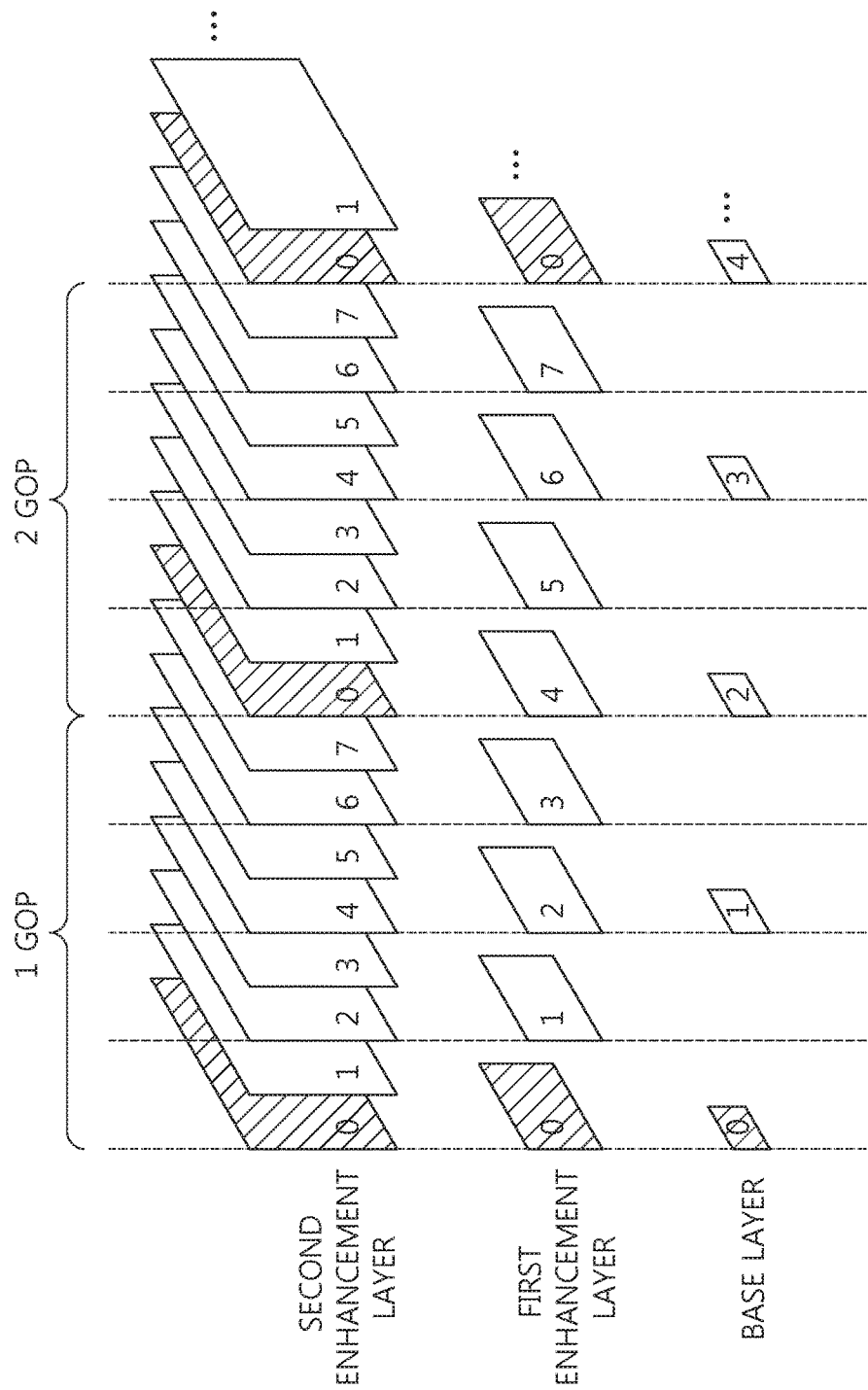
FIG. 3 is a conceptual diagram schematically illustrating a scalable video coding structure using a plurality of layers in accordance with an embodiment of the present invention.

FIG. 3 is a conceptual diagram schematically illustrating a scalable video coding structure using a plurality of layers according to an embodiment of the present invention. In FIG. 3, a group of picture (GOP) represents a picture group, that is, a group of pictures.

A transmission medium is required to transmit image data and performance thereof is different for each transmission medium according to various network environments. The scalable video coding method may be provided to be applied to various transmission media or network environments.

The video coding method (hereinafter, referred to as 'scalable coding' or 'scalable video coding') supporting the scalability is a coding method that increases encoding and decoding performances by removing inter-layer redundancy by using inter-layer texture information, motion information, a residual signal, and the like. The scalable video coding method may provide various scalabilities in spatial, temporal, quality, and view terms according to surrounding conditions such as transmission bit rate, transmission error rate, a system resource, and the like.

Scalable video coding may be performed by using a multiple-layer structure so as to provide a bitstream which is applicable to various network situations. For example, a scalable video coding structure may include a basic layer that compresses and processes the image data by using the general image decoding method and may include an improvement layer that compresses and processes the image data by using both decoding information of the basic layer and the general decoding method.

A base layer may be referred to as a base layer or a lower layer. An enhancement layer may be designated as an enhancement layer or a higher layer. In this case, the lower layer may represent a layer that supports lower scalability than a specific layer and the higher layer may represent a layer that supports higher scalability than a specific layer. Further, a layer referred to for encoding/decoding of a different layer may be called a reference layer and a layer encoded/decoded by using the different layer may be a current layer. The reference layer may be a lower layer than the current layer and the current layer may be a higher layer than the reference layer.

Herein, a layer means a set of images and bitstreams that are distinguished based on a space (for example, an image size), a time (for example, a decoding order, an image output order, and frame rate), image quality, complexity, and the like.

Referring to FIG. 3, for example, the basic layer may be defined as standard definition (SD), a frame rate of 15 Hz, and a bit rate of 1 Mbps, and a first enhanced layer may be defined as high definition (HD), a frame rate of 30 Hz, and a bit rate of 3.9 Mbps, and a second enhanced layer may be defined as ultra high definition (4K-UHE), a frame rate of 60 Hz, and a bit rate of 27.2 Mbps.

The format, frame rate, bit rate, and the like as one embodiment may be decided differently as necessary. Further, the number of used layers is not limited to the embodiment and may be decided differently according to a situation. For example, if a transmission bandwidth is 4 Mbps, data may be transmitted at 15 Hz or less by decreasing the frame rate of the HD of the first enhancement layer.

The scalable video coding method may provide spatial, temporal, quality, and view scalabilities by the method described in the embodiment of FIG. 3. In this specification, the scalable video coding has the same as the scalable video encoding in terms of encoding and the scalable video decoding in terms of decoding.

Generally, in the prediction between the screens, at least one of a previous picture or a next picture of the current picture is referred to as a reference picture, and prediction for the current block may be performed based on the reference picture.

A video used for the prediction of the current block is referred to as a reference picture or a reference frame.

A region in the reference picture used for predicting the current block may be represented by using a reference picture index refIdx indicating the reference picture, the motion picture, and the like.

In the prediction between the screens, the reference block corresponding to the reference picture and the current block in the reference picture is selected to generate the prediction block for the current block. In the inter-screen prediction, the prediction block may be created so that a residual signal with the current block is minimized and the size of the motion vector is also minimized.

In order to use the information of the reference picture in the inter-prediction, information of neighboring blocks positioned around the current block may be used. For example, the inter-prediction may adopt a skip mode, a merge mode, an advanced motion vector prediction, or the like according to a method using the information of the neighboring blocks. The skip mode, the merge mode, and the AMVP mode may generate the prediction block for the current block based on the information of the neighboring block.

The skip mode may use the information of the neighboring block for the current block as it is. Accordingly, in the case where the skip mode is applied, the encoder may transmit information that indicates which neighboring block to use motion information of as the motion information of the current block to the decoder and besides, does not transmit syntax information such as a residual, and the like to the decoder.

The merge mode may generate the prediction block for the current block by using the motion information of the neighboring block. When the merge mode is applied, the encoder may transmit to the decoder information that indicates whether to apply the merge mode to the current block, which neighboring block to use motion information of, and residual information on the current block, and the like. The decoder generates the prediction block for the current block by using the motion information and adds the generated prediction block and the residual transmitted from the encoder to reconstruct the current block.

The AMVP may predict the motion vector of the current block by using the motion information of the neighboring blocks. When the AMVP is applied, the encoder may transmit to the decoder information that indicates which neighboring block to use motion information of, a difference between a motion vector of the current block and a predicted motion vector, a reference picture index that indicates the reference picture, and the like. The decoder predicts the motion vector of the current block by using the motion information (motion vector) of the neighboring block, and may calculate the motion vector of the current block by using the motion vector difference received from the encoder. The decoder may generate the prediction block for the current block based on the calculated motion vector and the reference picture index information received from the encoder.

In case of the inter prediction, the decoder may verify a skip flag, a merge flag, and the like that are received from the encoder and calculate motion information required for the inter-prediction of the current block (for example, information regarding a motion vector, a reference picture index, and the like) according to the verified information.

A processing unit in which the prediction is performed may be different from a processing unit in which a prediction method and a detailed content are determined. For example, the inter-prediction or the intra-prediction may be determined by the coding unit (CU), and a prediction mode for the intra-prediction and a prediction mode for the inter-prediction may be determined by the prediction unit (PU). Alternatively, the prediction mode is determined by the prediction unit, and as a result, the prediction may be performed by the transform unit (TU).

Meanwhile, since an inter-layer strong correlation is present in the scalable video coding structure that supports the plurality of layers, when the prediction is performed by using the correlation, a duplicative element of data may be removed and encoding performance of the image may be improved. Accordingly, when a picture (image) of the current layer (higher layer) which is encoded/decoded is predicted, the inter-prediction or the intra-prediction using information of the current layer and the inter-layer prediction using information of a different layer may be performed.

Since the plurality of layers may be different from each other in terms of at least one of a resolution, a frame rate, a color format, and a view (that is, an inter-layer scalability difference), signal distortion may occur in the inter-layer prediction for the current layer and the residual signal may be increased.

Accordingly, the present invention provides a method that may perform the inter-prediction for the current layer by mapping the motion information of the reference layer (lower layer) which the current layer (higher layer) refers to in an image size of the current layer and thereafter, adding the mapped motion information to the reference picture list of the current layer.

Further, the present invention relates to encoding and decoding of an image including a plurality of layers or views, and the plurality of layers or views may be expressed as first, second, third, and n-th layers or first, second, third, and n-th views.

Hereinafter, in the embodiment of the present invention, an image in which the first layer and the second layer are present is described as an example, but the embodiment may be applied even to an image in which more layers or views than the first layer and the second layer in the same method as above. Further, the first layer may be expressed as the lower layer, the base layer, or the reference layer and the second layer may be expressed as the higher layer, the enhancement layer, or the current layer.

Figure 4:
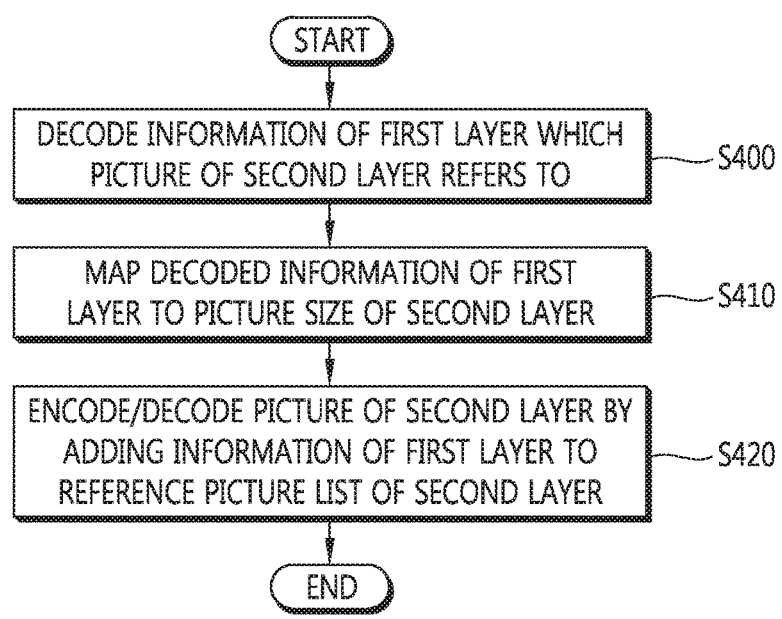
FIG. 4 is a flowchart schematically illustrating a method for performing an inter-layer prediction (inter-layer prediction) in scalable video coding in accordance with an embodiment of the present invention.

FIG. 4 is a flowchart schematically illustrating a method for performing an inter-layer prediction (inter-layer prediction) in scalable video coding in accordance with an embodiment of the present invention. The method of FIG. 4 may be performed by the image encoding apparatus of FIG. 1 or the image decoding apparatus of FIG. 2.

Referring to FIG. 4, the encoding/decoding apparatus decodes information of a first layer which an image (picture) of a second layer refers to (S400).

As described above, the second layer means a layer that performs encoding/decoding at present and may be a higher layer that provides higher scalability than the first layer. The first layer may be a layer referred to for encoding/decoding the second layer, and may be designated as the reference layer or the lower layer.

The encoding/decoding apparatus may decode and use the first layer by the reference signal for predicting an encoding/decoding target block in the image of the second layer.

Information (decoding target information of the first layer) of the first layer to be decoded may include a sample value and motion information of a first layer image (picture). Herein, the motion information may include regarding a motion vector value, a reference picture index, a prediction direction indicator, a reference picture POC (picture order count), a prediction mode, a reference picture list, a merge flag, a merge index, a picture type (a short-term reference picture or a long-term reference picture) of the reference picture, and the like. Decoded motion information of the first layer may be compressed and stored by a unit block having a size of N×N. For example, the decoded motion information of the first layer may be compressed and stored every 16×16 blocks.

The encoding/decoding apparatus maps the decoded information of the first layer to an image size of the second layer (S410).

Herein, mapping may represent sampling a sample of an image in order to adjust an image size or a resolution when images are different from each other in size or resolution, and may include sampling of a sample value of the image and motion information of the image.

In other words, the encoding/decoding apparatus may sample the decoded first layer image and refer to a sample information and motion information of the sampled first layer image, in order to map the decoded first layer image to a size of the second layer image.

Since sizes of images of layers may be different in the scalable video coding structure, when sizes of the images between the layers (between the first layer and the second layer) are different, the encoding/decoding apparatus may resample samples values of the decoded first layer image in order to map the size of the decoded first layer image to the image size of the second layer.

For example, when the size of the decoded first layer image is 960×540 and the size of the image of the second layer is 1920×1080, the encoding/decoding apparatus may perform upsampling of mapping the size of the decoded first layer image to the size of 1920×1080 which is the image size of the second layer. The upsampling may be performed in order to adjust image sizes of layers having different image sizes, and interpolation is applied to an image of a layer (the reference layer or the lower layer) having a small image size, and as a result, interpolated samples are calculated to adjust the image size.

The encoding/decoding apparatus may map the decoded motion information of the first layer to the image size of the second layer to use the mapped motion information of the first layer. Inter-layer motion information mapping of mapping the motion information of the decoded first layer image to the image size of the second layer may divide the second layer image into unit blocks having N×N and use the motion information of the first layer corresponding to each of the N×N unit blocks of the second layer as motion information of a corresponding block of the second layer.

Hereinafter, an inter-layer motion information mapping method according to an embodiment of the present invention will be described through an embodiment of FIGS. 5 and 6.

Figure 5:
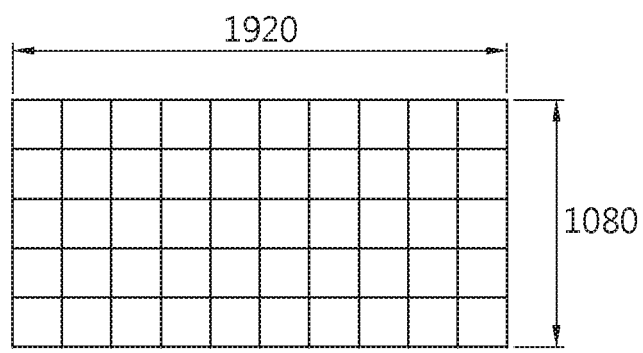
FIGS. 5 and 6 are diagrams illustrated for describing an inter-layer motion information mapping method in accordance with an embodiment of the present invention.
Figure 6:
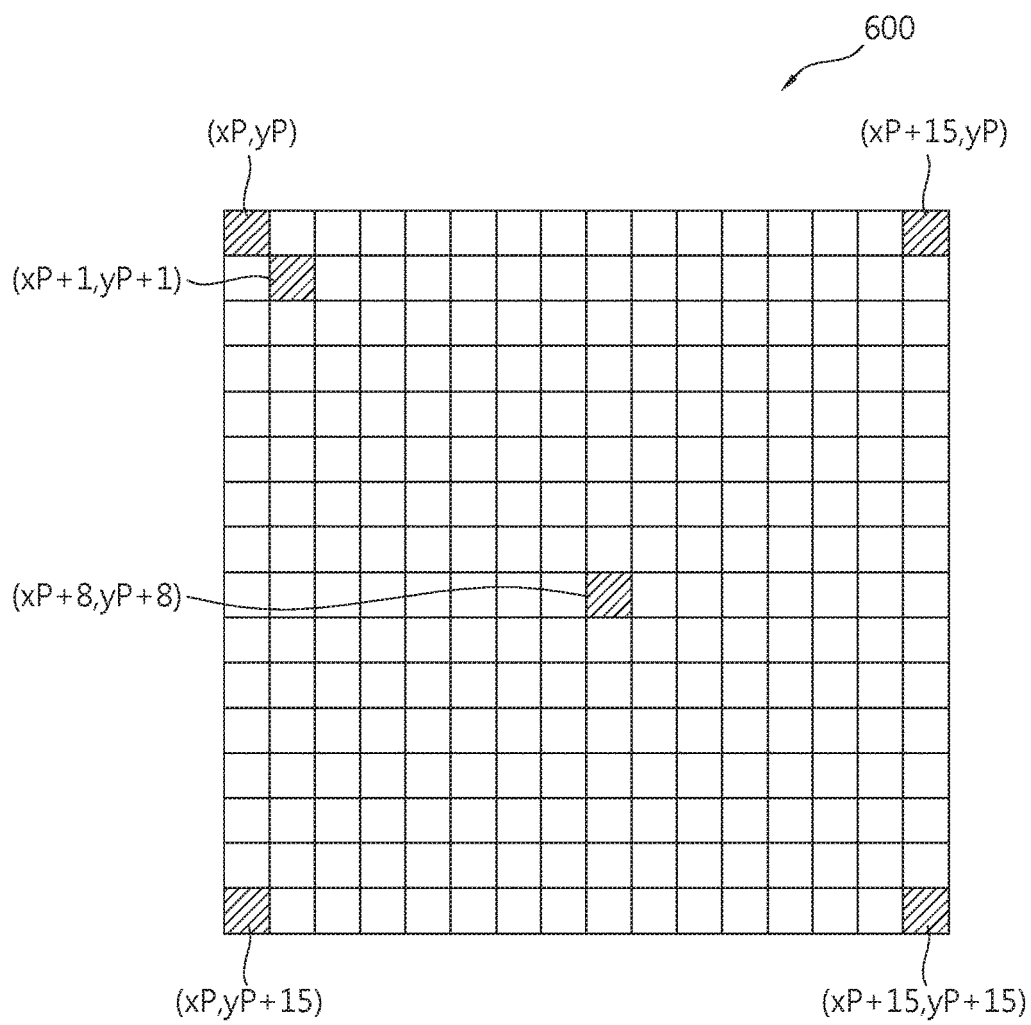

FIGS. 5 and 6 are diagrams illustrated for describing an inter-layer motion information mapping method in accordance with an embodiment of the present invention.

FIG. 5 illustrates an image of a second layer divided into unit blocks having a size of N×N.

For example, as illustrated in FIG. 5, when the image size of the second layer is 1920×1080 and N=16, the encoding/decoding apparatus may divide the image of the second layer into total 8160 (16×16) unit blocks and use motion information of a first layer block corresponding to each unit block of the second layer as motion information of the corresponding block of the second layer.

In this case, the motion information may be stored for each unit block. Alternatively, the motion information is stored in the form of a look-up table for each picture to be used by referring to each unit block.

FIG. 6 illustrates N×N blocks of the second layer and as one example, illustrates a 16×16 block 600 in case of N=16. Respective quadrangles in the 16×16 block 600 mean one sample and it is assumed that uppermost and leftmost sample position in the 16×16 block 600 is (xP, yP).

As described above, when the inter-layer motion information is mapped, the motion information of the first layer block corresponding to each of the N×N unit blocks of the second layer is mapped to the motion information of the second layer to be used. In this case, the motion information of the first layer block corresponding to each of the N×N blocks of the second layer may be motion information of a first layer sample position corresponding to a reference sample position of the N×N blocks of the second layer.

For example, as illustrated in FIG. 6, the encoding/decoding apparatus determines as the reference sample position a position (xP+8, yP+8) in the 16×16 block 600 of the second layer and uses the motion information of the first layer sample position corresponding to the reference sample position (xP+8, yP+8) to perform the inter-layer motion information mapping.

Alternatively, the encoding/decoding apparatus determines as the reference sample position the position (xP, yP) in the 16×16 block 600 of the second layer and uses the motion information of the first layer sample position corresponding to the reference sample position (xP, yP) to perform the inter-layer motion information mapping.

Alternatively, the encoding/decoding apparatus determines as the reference sample position a position (xP+15, yP) in the 16×16 block 600 of the second layer and uses the motion information of the first layer sample position corresponding to the reference sample position (xP+15, yP) to perform the inter-layer motion information mapping.

Alternatively, the encoding/decoding apparatus determines as the reference sample position a position (xP, yP+15) in the 16×16 block 600 of the second layer and uses the motion information of the first layer sample position corresponding to the reference sample position (xP, yP+15) to perform the inter-layer motion information mapping.

Alternatively, the encoding/decoding apparatus determines as the reference sample position a position (xP+15, yP+15) in the 16×16 block 600 of the second layer and uses the motion information of the first layer sample position corresponding to the reference sample position (xP+15, yP+15) to perform the inter-layer motion information mapping.

Alternatively, the encoding/decoding apparatus determines as the reference sample position a position (xP+1, yP+1) in the 16×16 block 600 of the second layer and uses the motion information of the first layer sample position corresponding to the reference sample position (xP+1, yP+1) to perform the inter-layer motion information mapping.

The encoding/decoding apparatus may perform the inter-layer motion information mapping by using a difference reference sample position as well as the aforementioned reference sample position and the motion information of the first layer sample position corresponding thereto.

The sample position of the first layer corresponding to a reference sample position of the second layer may be calculated as illustrated in Equation 1 below by considering the size of an inter-layer image.

$$xRef=(xP*picWRL+ScaledW/2)/ScaledW$$

$$yRef=(yP*picHRL+ScaledH/2)/ScaledH \quad \text{[Equation 1]}$$

Where xRef and yRef represent the sample position of the first layer, xP and Yp represent the reference sample position of the second layer, ScaledW and ScaledH represent horizontal and vertical sizes of the first layer picture, and picWRL and picHRL represent horizontal and vertical sizes of the first layer picture.

For example, when the motion information of the first layer is compressed and stored by the unit of 16×16, the sample position of the first layer calculated by Equation 1 may be adjusted to use 16×16-unit motion information through Equation 2 below.

$$xRL=(xRef>>4)<<4$$

$$yRL=(yRef>>4)<<4 \quad \text{[Equation 2]}$$

As another example, when the motion information of the first layer is compressed and stored by the unit of 8×8, the sample position of the first layer calculated by Equation 1 may be adjusted to use 8×8-unit motion information through Equation 3 below.

$$xRL=(xRef>>3)<<3$$

$$yRL=(yRef>>3)<<3 \quad \text{[Equation 3]}$$

When the prediction mode of the first layer sample position corresponding to the reference sample position of the second layer is the intra prediction mode, the encoding/decoding apparatus may use (0, 0) as a motion vector value of the corresponding block of the second layer and allocate a value of −1 to the reference picture index and the reference picture POC of the corresponding block of the second layer.

Alternatively, when the prediction mode of the first layer sample position corresponding to the reference sample position of the second layer is the intra prediction mode, the encoding/decoding apparatus may use (0, 0) as the motion vector value of the corresponding block of the second layer and allocate a specific value (for example, allocate 0 to the reference picture index and a POC of a picture indicated by the reference picture index to the reference picture POC) to the reference picture index and the reference picture POC of the corresponding block of the second layer.

When the prediction mode of the first layer sample position corresponding to the reference sample position of the second layer is the inter prediction mode, the encoding/decoding apparatus may use, as the motion information of the corresponding block of the second layer, the motion vector value of the first layer sample position, the reference picture index, and the reference picture POC.

In case of using the motion vector of the first layer, the encoding/decoding apparatus may use the motion vector of the first layer by reflecting the size of the inter-layer image as illustrated in Equation 4 below.

$$mvLX[xP][yP][0]=(mvLXRL[xRL][yRL][0]*ScaledW+offset)/PicWRL$$

$$mvLX[xP][yP][1]=(mvLXRL[xRL][yRL][1]*ScaledH+offset)/PicHRL \quad \text{[Equation 4]}$$

The encoding/decoding apparatus may use, as information of the corresponding block of the second layer, picture type information (picture type information regarding whether the reference picture being a short-term reference picture or a long-term reference picture) of the reference picture which the corresponding block of the first layer corresponding to the block of the second layer refers to.

The aforementioned inter-layer motion information mapping may be determined in a higher level and the encoding apparatus may transmit information related with the inter-layer motion information mapping in the higher level. The decoding apparatus may acquire the inter-layer motion information mapping related information from the higher level.

The higher level may be a video parameter set (VPS), a sequence parameter set (SPS), a picture parameter set (PPS), a slice segment header, and the like.

Hereinafter, a method for signaling the motion information mapping related information in the higher level according to an embodiment of the present invention will be described.

According to the embodiment of the present invention, information related to motion information mapping of a corresponding layer in the VPS may be signaled as represented in Table 1.

TABLE 1

| | Descriptor |
|---|---|
| vps_extension( ) {<br>    for ( i = 1; i <= vps_max_layer_id; i++)<br>        inter_layer_mfm_enable_flag [i]<br>} | <br><br>u(1) |

Referring to Table 1, when inter_layer_mfm_enable_flag is 0, motion information mapping of an i-th layer may not be performed.

When inter_layer_mfm_enable_flag is 1, the motion information mapping of the i-th layer may be performed.

According to another embodiment of the present invention, information related to motion information mapping of a corresponding layer in extension of the SPS may be signaled as represented in Table 2.

TABLE 2

| | Descriptor |
|---|---|
| sps_extension( ) {<br>    sps_inter_layer_mfm_enable_flag<br>} | <br>u(1) |

Referring to Table 2, when sps_inter_layer_mfm_enable_flag is 0, motion information mapping of the first layer may not be performed.

When sps_inter_layer_mfm_enable_flag is 1, the motion information mapping of the first layer may be performed.

According to yet another embodiment of the present invention, whether to transmit information (for example, sps_inter_layer_mfm_enable_flag) that indicates whether to perform the motion information mapping of the corresponding layer may be determined according to information (for example, sps_temporal_mvp_enabled_flag) that indicates whether to use a temporal motion vector prediction transmitted in the SPS as represented in Table 3.

TABLE 3

| | Descriptor |
|---|---|
| sps_extension( ) {<br>    if ( sps_temporal_mvp_enabled_flag)<br>        sps_inter_layer_mfm_enable_flag<br>} | <br><br>u(1) |

Referring to Table 3, when sps_temporal_mvp_enabled_flag is 1, which indicates whether to use the temporal motion vector prediction, sps_inter_layer_mfm_enable_flag may be transmitted, which indicates whether to perform the motion information mapping of the first layer.

When sps_temporal_mvp_enabled_flag is 1 and sps_inter_layer_mfm_enable_flag is 0, the motion information of the first layer may not be used in the second layer. That is, a reconstructed image of the first layer may not be used as a temporal motion vector predictor (TMVP) of the second layer.

According to yet another embodiment of the present invention, whether to perform the motion information mapping of the corresponding layer may be determined by the value of sps_temporal_mvp_enabled_flag without transmitting sps_inter_layer_mfm_enable_flag as represented in Table 3. For example, it is regarded that sps_inter_layer_mfm_enable_flag is 1 when sps_temporal_mvp_enabled_flag is 1 to perform the motion information mapping of the corresponding layer. It is regarded that sps_inter_layer_mfm_enable_flag is 0 when sps_temporal_mvp_enabled_flag is 0 to perform the motion information mapping of the corresponding layer.

According to yet another embodiment of the present invention, the information related to the motion information mapping of the corresponding layer in extension of the PPS may be signaled as represented in Table 4.

TABLE 4

| | Descriptor |
|---|---|
| pps_extension( ) {<br>    pps_inter_layer_mfm_enable_flag<br>} | <br>u(1) |

Referring to Table 4, when pps_inter_layer_mfm_enable_flag is 0, the motion information mapping of the first layer may not be performed.

When pps_inter_layer_mfm_enable_flag is 1, the motion information mapping of the first layer may be performed.

According to yet another embodiment of the present invention, the information related to the motion information mapping of the corresponding layer in extension of the slice segment header may be signaled as represented in Table 5.

TABLE 5

| | Descriptor |
|---|---|
| if ( slice_segment_header_extension_present_flag)<br>    slice_inter_layer_mfm_enable_flag<br>} | <br>u(1) |

Referring to Table 5, when slice_inter_layer_mfm_enable_flag is 0, the motion information mapping of the first layer may not be performed.

When slice_inter_layer_mfm_enable_flag is 1, the motion information mapping of the first layer may be performed.

According to yet another embodiment of the present invention, the information related to the motion information mapping of the corresponding layer in the extension of the slice segment header may be signaled as represented in Table 6.

TABLE 6

| | Descriptor |
|---|---|
| if ( slice_segment_header_extension_present_flag)<br>    if ( slice_temporal_mvp_enabled_flag )<br>        slice_inter_layer_mfm_enable_flag<br>} | u(1) |

Referring to Table 6, when slice_temporal_mvp_enabled_flag is 1, which indicates whether to use the temporal motion vector prediction, slice_inter_layer_mfm_enable_flag may be transmitted, which indicates whether to perform the motion information mapping of the first layer. slice_inter_layer_mfm_enable_flag is transmitted only in a layer (that is, the enhancement layer) other than the base layer and in case of the enhancement layer, when there is no layer used for a motion prediction, slice_inter_layer_mfm_enable_flag may not be transmitted. When the corresponding flag is not present, a value of the corresponding flag value may be inferred as 0.

When slice_temporal_mvp_enabled_flag is 1 and slice_inter_layer_mfm_enable_flag is 0, the motion information of the first layer may not be used in the second layer. That is, the reconstructed image of the first layer may not be used as the temporal motion vector predictor (TMVP) of the second layer.

When slice_inter_layer_mfm_enable_flag is transmitted in the layer (that is, the enhancement layer) other than the base layer, slice_inter_layer_mfm_enable_flag may be present above slice_segment_header_extension_present_flag in the slice segment header of the layer (that is, the enhancement layer) other than the base layer as represented in Table 7.

TABLE 7

| | Descriptor |
|---|---|
| slice_segment_header( ){<br>    if ( slice_temporal_mvp_enabled_flag )<br>        slice_inter_layer_mfm_enable_flag<br>} | u(1) |

Referring to Table 7, when slice_temporal_mvp_enabled_flag is 1, which indicates whether to use the temporal motion vector prediction, slice_inter_layer_mfm_enable_flag may be transmitted, which indicates whether to perform the motion information mapping of the first layer.

When slice_temporal_mvp_enabled_flag is 1 and slice_inter_layer_mfm_enable_flag is 0, the motion information of the first layer may not be used in the second layer. That is, the reconstructed image of the first layer may not be used as the temporal motion vector predictor (TMVP) of the second layer.

When slice_temporal_mvp_enabled_flag is 1 and slice_inter_layer_mfm_enable_flag is 1, the motion information of the first layer may be used in the second layer. That is, after the motion information of the first layer is mapped to the size of the second layer, the reconstructed image of the first layer may be used as a collocated picture (ColPic) for the TMVP of the second layer.

When slice_inter_layer_mfm_enable_flag is 1, information on the collocated picture (ColPic) of the first layer for the TMVP of the second layer may be signaled through additional syntax information as represented in Table 8. For example, information of a referred layer may be known through collocated_ref_layer_idx and motion information of the reference layer collocated picture may be mapped to the image size of the second layer. Further, in case of a B slice, a reference picture list direction where the picture of the reference layer is positioned which may be used as the collocated picture may be determined through collocated_ref_layer_from_l0_flag.

TABLE 8

| |
|---|
| slice_segment_header( ) {<br>    if( slice_temporal_mvp_enabled_flag ) {<br>        slice_inter_layer_mfm_enable_flag            u(1)<br>        if(slice_inter_layer_mfm_enable_flag ) {<br>            collocated_ref_layer_idx                     ue(v)<br>            if ( slice_type == B)<br>                collocated_ref_layer_from_l0_flag<br>        }<br>        else {<br>            if( slice_type = = B )<br>                collocated_from_l0_flag                   u(1)<br>            if( ( collocated_from_l0_flag &&<br>            num_ref_idx_l0_active_minus1 > 0 ) \|\|<br>                ( !collocated_from_l0_flag &&<br>                num_ref_idx_l1_active_minus1 > 0 ) )<br>                collocated_ref_idx                        ue(v)<br>        }<br>    }<br>} |

Referring to Table 8, collocated_ref_layer_idx is an indicator that indicates information of the reference layer used for the motion prediction when the number of reference layers used for the motion prediction is 2 or more. When the number of reference layers used for the motion prediction is 1, collocated_ref_layer_idx may be skipped. In this case, a restriction that all slices in the picture need to have the same value may be imposed.

collocated_ref_layer_from_l0_flag is transmitted in the B slice. When a value of collocated_ref_layer_from_l0_flag is 1, a picture that is present in LIST0 is set as the collocated picture (ColPic). When the value of collocated_ref_layer_from_l0_flag is 0, a picture that is present in LIST1 is set as the collocated picture (ColPic). Thereafter, during acquiring a motion vector of a collocated block (ColPb) in the collocated picture (ColPic), the value of collocated_ref_layer_from_l0_flag may be used as the same meaning instead of collocated_from_l0_flag. In this case, the restriction that all slices in the picture need to have the same value may be imposed. Alternatively, during acquiring the motion vector of the collocated block (ColPb) in the collocated picture (ColPic), when the collocated block has motion information in directions of LIST0 and LIST1, motion information in the same direction as a direction indicated by a current encoding/decoding target picture may be brought.

When the base layer or slice_inter_layer_mfm_enable_flag is 0, a list direction and a collocated picture in the second layer may be known by using collocated_from_l0_flag and collocated_ref_idx without using the motion information of the reference layer.

When slice_inter_layer_mfm_enable_flag is 1, the information on the collocated picture (ColPic) of the first layer for the TMVP of the second layer and the information on the reference picture list direction may be signaled through additional syntax information as represented in Table 9. For example, when slice_temporal_mvp_enabled_flag is 1, the reference picture list direction of the collocated picture may be determined from the value of collocated_from_l0_flag, and a referred layer may be known from the value of collocated_ref_layer_idx.

TABLE 9

```
slice_segment_header( ) {
    if( slice_temporal_mvp_enabled_flag ) {
        if ( slice_type == B)
            collocated_from_l0_flag
            slice_inter_layer_mfm_enable_flag              u(1)
            if(slice_inter_layer_mfm_enable_flag ) {
                collocated_ref_layer_idx                    ue(v)
            }
        else {
            if( ( collocated_from_l0_flag &&
                num_ref_idx_l0_active_minus1 > 0 ) ||
                ( !collocated_from_l0_flag &&
                num_ref_idx_l1_active_minus1 > 0 ) )
                    collocated_ref_idx                      ue(v)
        }
    }
}
```

Referring to Table 9, collocated_from_l0_flag indicates the reference picture list direction to which the collocated picture belongs when slice_temporal_mvp_enabled_flag is 1 and in case of the B slice. When collocated_from_l0_flag is not present, collocated_from_l0_flag may be inferred as 1. In this case, the restriction that all slices in the picture need to have the same value may be imposed.

collocated_ref_layer_idx is an indicator that indicates information of the reference layer used for the motion prediction when the number of reference layers used for the motion prediction is 2 or more. When the number of reference layers used for the motion prediction is 1, collocated_ref_layer_idx may be skipped. In this case, the restriction that all slices in the picture need to have the same value may be imposed. The list direction for the collocated picture may be determined from collocated_from_l0_flag transmitted in the higher layer.

When the base layer or slice_inter_layer_mfm_enable_flag is 0, a list direction and a collocated picture in the second layer may be known by using collocated_from_l0_flag and collocated_ref_idx without using the motion information of the reference layer.

When slice_inter_layer_mfm_enable_flag is 1, information of a referred layer may be known through collocated_ref_layer_idx and the motion information of the reference layer collocated picture may be mapped to the image size of the second layer, as represented in Table 10. In this case, according to a slice type, in case of a P slice, the picture of the reference layer which is present in LIST0 is set as the collocated picture and in case of the B slice, one direction of LIST0 and LIST1 is regulated and the picture of the corresponding reference layer is set as the collocated picture to be similarly used by the encoding/decoding apparatus.

When the base layer or slice_inter_layer_mfm_enable_flag is 0, a list direction and a collocated picture in the second layer may be known by using collocated_from_l0_flag and collocated_ref_idx without using the motion information of the reference layer.

TABLE 10

```
slice_segment_header( ){
    if( slice_temporal_mvp_enabled_flag ) {
        slice_inter_layer_mfm_enable_flag               u(1)
        if(slice_inter_layer_mfm_enable_flag ) {
            collocated_ref_layer_idx                    ue(v)
        }
        else {
            if( slice_type = = B )
                collocated_from_l0_flag                 u(1)
            if( ( collocated_from_l0_flag &&
                num_ref_idx_l0_active_minus1 > 0 ) ||
                ( !collocated_from_l0_flag &&
                num_ref_idx_l1_active_minus1 > 0 ) )
                    collocated_ref_idx                  ue(v)
        }
    }
}
```

According to yet another embodiment of the present invention, when the picture is divided into N independent slices, slice_inter_layer_mfm_enable_flags in respective slice segment headers need to have the same value and one motion information mapping process per picture may be performed according to the value of slice_inter_layer_mfm_enable_flag in a first independence slice segment header.

In the aforementioned embodiments of the present invention, 'sps_inter_layer_mfm_enable_flag' transmitted in the higher level is used as information that indicates whether to perform the motion information mapping, but the information is extended to be used as information that indicates whether to perform an inter-layer syntax prediction. For example, when sps_inter_layer_mfm_enable_flag is 1, the inter-layer syntax (motion information) prediction may be performed as well as the motion information mapping.

In the aforementioned embodiments of the present invention, a separate syntax that indicates whether to perform the motion information mapping is used, but the motion information mapping may be performed according to a syntax information value regarding execution of the inter-layer prediction without transmitting the separate syntax.

In the present invention, it may be judged whether to perform the motion information mapping by using the syntax information that indicates whether to perform the inter-layer prediction signaled in the higher layer. The syntax information that indicates whether to perform the inter-layer prediction may be signaled in the higher level.

The higher level may be the video parameter set (VPS), the sequence parameter set (SPS), the picture parameter set (PPS), the slice segment header, and the like.

According to an embodiment of the present invention a syntax that indicates whether to perform the inter-layer prediction may be transmitted in the VPS as represented in Table 11.

TABLE 11

| | Descriptor |
|---|---|
| vps_extension( ) {<br>    for ( i = 1; i <= vps_max_layer_id; i++)<br>        no_inter_layer_pred_flag [i]<br>} | <br><br>u(1) |

Referring to Table 11, in the case where the syntax that indicates whether to perform the inter-layer prediction is transmitted in the VPS, when no_inter_layerpred_flag is 1, the motion information mapping may not be performed and when no_inter_layerpred_flag is 0, the motion information mapping may be performed.

In the present invention, it may be judged whether to perform the motion information mapping by using the syntax information that indicates whether to perform the inter-layer syntax prediction signaled in the higher layer. The syntax information that indicates whether to perform the inter-layer syntax prediction may be signaled in the higher level.

The higher level may be the video parameter set (VPS), the sequence parameter set (SPS), the picture parameter set (PPS), the slice segment header, and the like.

According to an embodiment of the present invention a syntax that indicates whether to perform the inter-layer syntax prediction may be transmitted in the PPS as represented in Table 12.

TABLE 12

| | Descriptor |
|---|---|
| if ( pps extension_flag )<br>    no_inter_layer_syntax_pred_flag<br>} | u(1) |

Referring to Table 12, in the case where the syntax that indicates whether to perform the inter-layer syntax prediction is transmitted in the PPS, when no_inter_layer_syntax-pred_flag is 0, the motion information mapping may be performed and when no_inter_layer_syntax_pred_flag is 1, the motion information mapping may not be performed.

According to another embodiment of the present invention a syntax that indicates whether to perform the inter-layer syntax prediction may be transmitted in the syntax segment heard as represented in Table 13.

TABLE 13

| | Descriptor |
|---|---|
| if ( slice_segment_header_extension_present_flag)<br>    no_inter_layer_syntax_pred_flag<br>} | u(1) |

Referring to Table 13, in the case where the syntax that indicates whether to perform the inter-layer syntax prediction is transmitted in the slice segment header, when no_inter_layer_syntaxpred_flag is 0, the motion information mapping may be performed and when no_inter_layer_syntax_pred_flag is 1, the motion information mapping may not be performed.

Referring back to FIG. 4, the encoding/decoding apparatus adds the information of the first layer to the reference picture list of the second layer to encode/decode the image of the second layer (S420).

That is, the encoding/decoding apparatus may add decoded sample values and motion information of the first layer mapped to the second layer image size to the reference picture list for the current encoding/decoding target image of the second layer through steps S400 to S410 described above, and configure the reference picture list of the second layer image by using the added information of the first layer. In addition, the encoding/decoding apparatus may perform the inter prediction of generating the prediction signal for the image of the second layer based on the reference picture list.

When the reference picture list of the second layer is configured, the decoded image of the first layer may be added to a last position of the reference picture list for the current encoding/decoding target image of the second layer.

Alternatively, the decoded image of the first layer may be added to a specific position of the reference picture list for the current encoding/decoding target image of the second layer. In this case, the specific position may be known in the higher level (for example, the VPS, the SPS, the PPS, the slice segment header, and the like) or the specific position may be designated by a determined regulation without transmitting additional information.

Alternatively, the decoded image of the first layer may be added to reference picture lists L0 and L1 for the current encoding/decoding target image of the second layer. In this case, positions added to the reference picture lists L0 and L1 may be the same as each other or different from each other. For example, the decoded image of the first layer may be added to a first position in the reference picture list L0 and the decoded image of the first layer may be added to a last position in the reference picture list L1.

Alternatively, the decoded image of the first layer may be added to any one of the reference picture list directions L0 and L1 for the current encoding/decoding target image of the second layer. For example, when the current encoding/decoding target image of the second layer is encoded/decoded to the B slice, the decoded image of the first layer may be added to only the reference picture list L0 or the reference picture list L1.

In this case, when the decoded image of the first layer is added to a specific-direction reference picture list, there may be known a position in the specific-direction reference picture list to which the decoded image of the first layer is to be added in the higher level (for example, the VPS, the SPS, the PPS, the slice segment header, and the like) or a specific position may be designated according to a determined regulation without transmitting additional information.

Alternatively, the decoded image of the first layer may be added to different positions of the reference picture list depending on a depth by using hierarchical depth information of a prediction structure. In this case, information on the positions may be known in the higher level (for example, the VPS, the SPS, the PPS, the slice segment header, and the like). For example, the position in the reference picture list to which the decoded image of the first layer is added may vary based on a value of a temporal level (temporal_Id) depending on the hierarchical depth. As one example, in the case where the temporal level temporal_Id is equal to or more than 2, the decoded image of the first layer may be added to the last position and in the case where the temporal level temporal_Id is less than 2, the decoded image of the first layer may be added to the first position of the reference picture list. In this case, a reference temporal level value may be known in the higher level (for example, the VPS, the SPS, the PPS, the slice segment header, and the like).

The decoded image of the first layer may include the decoded motion information of the first layer mapped to the image size of the second layer as well as the decoded sample values of the first layer.

The encoding/decoding apparatus may add the decoded image of the first layer to the reference picture list for the current encoding/decoding target image of the second layer by the aforementioned method and thereafter, predict the current encoding target image of the second layer by a general inter-prediction method.

When the prediction is performed by using the decoded image of the first layer as a reference signal of the current encoding target image of the second layer (when the inter-layer prediction is performed), the encoding apparatus may use as a prediction signal a first layer sample value at the same position as a prediction block in the current encoding target image without a motion predicting process. In this case, the encoding apparatus may not transmit motion information (for example, a motion vector difference value, a motion prediction candidate flag, and the like) of a corresponding block.

The decoding apparatus may use as the prediction signal the first layer sample value at the same position as the prediction block in the current decoding target image without decoding the motion information (for example, the motion vector difference value, the motion prediction candidate flag, and the like) for the prediction block in the current decoding target image of the second layer when the an image indicated by the reference picture index of the second layer is the decoded image of the first layer in the reference picture list.

When an image indicated by the reference picture index of the current decoding target block of the second layer is the decoded image of the first layer in the reference picture list (when the inter-layer prediction is performed), the decoding apparatus may predict the current decoding target block of the second layer by judging whether to decode the motion information (for example, the motion vector difference value, the motion prediction candidate flag, and the like) for the current decoding target block of the second layer based on information transmitted in the higher level (for example, the VPS, the SPS, the PPS, the slice segment header, and the like).

Table 14 represents one example of a syntax in which information (sps_inter_layer_mv_zero_flag) that indicates whether an inter-layer motion vector has a value of (0, 0) is transmitted in the SPS.

TABLE 14

|  | Descriptor |
| --- | --- |
| sps_extension( ) {<br>    sps_inter_layer_mv_zero_flag<br>} | u(1) |

Referring to Table 14, when sps_inter_layer_mv_zero_flag transmitted in the SPS has a value of 1 and the reference picture index of the current decoding target block indicates the decoded image of the first layer in the reference picture list, the decoding apparatus may use, as the prediction signal for the current decoding target block, the decoded sample value of the first layer image which has the same position as the current target block without decoding the motion vector difference value and the motion prediction candidate flag.

When sps_inter_layer_mv_zero_flag transmitted in the SPS has a value of 0 and the reference picture index of the current decoding target block indicates the decoded image of the first layer in the reference picture list, the decoding apparatus may decode the motion vector difference value and the motion prediction candidate flag and thereafter, acquire a motion vector value, and use, as the prediction signal for the current decoding target block, the decoded sample value of the first layer image which is at a position of the acquired motion vector value.

Meanwhile, the encoding apparatus may use the decoded image of the first layer as a collocated picture for predicting the temporal motion vector of the second layer in order to use the mapped motion information of the first layer as a temporal motion vector candidate for the current encoding target block of the second layer. In this case, the encoding apparatus may designate the decoded image of the first layer as the collocated image through information (collocated_ref_idx) that indicates the collocated picture in the slice segment header.

When the information (collocated_ref_idx) that indicates the collocated picture in the slice segment header transmitted in the encoder indicates the decoded image of the first layer, the decoding apparatus may use the mapped motion information of the first layer as the temporal motion vector candidate of the second layer.

When the mapped motion information of the first layer is used as the temporal motion vector candidate of the second layer, the encoding/decoding apparatus may use at least one of the mapped motion information of the first layer, that is, at least one of the reference picture POC, the reference picture list, and the picture type (the short-term picture and the long-term reference picture) of the reference picture and scale and use a motion vector of the second layer according to a temporal distance by using one or more pieces of mapped motion information of the first layer.

When the prediction is performed by adding only the decoded reference sample values of the first layer image to the reference picture list without permitting the motion information mapping of the first layer, the information (collocated_ref_idx) that indicates the collocated picture may be restricted in a standard document so as not to indicate the decoded image of the first layer as the collocated picture.

As another example of using the mapped motion information of the first layer as the motion information of the second layer, the mapped motion information of the first layer may be used not as the temporal motion vector candidate of the second layer but as an additional candidate mode. In this case, the information (collocated_ref_idx) that indicates the collocated picture may be restricted in the standard document so as not to indicate the decoded image of the first layer as the collocated picture, so that the temporal motion vector candidate of the second layer is calculated from the reference picture of the second layer. Further, in order to use the motion information of the first layer mapped to the additional candidate mode, the encoding apparatus may additionally transmit an index (for example, base_ref_idx) that may indicate a position of the mapped image of the first layer in the reference picture list in the slice segment header, and the like in the slice segment header, and the like. A position of the additional candidate mode in the reference picture list may be applied similarly to the encoding apparatus and the decoding apparatus.

The method according to the present invention is prepared as a program for being executed in a computer to be stored in a computer-readable medium, and examples of the computer readable recording medium include ROM, RAM, CD-ROM, a magnetic tape, a floppy disk, an optical data storing device and the computer readable recording medium may also be implemented in a form of a carrier wave (for example, transmission through the Internet).

Further, the computer-readable recording media are distributed on computer systems connected through the network, and thus the computer-readable recording media may be stored and executed as the computer-readable code by a distribution scheme. Further, functional programs, codes, and code segments for implementing the method may be easily inferred by a programmer in a technical field to which the present invention belongs.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

While some exemplary embodiments of the present invention have been described with reference to the accompanying drawings, those skilled in the art may change, modify, and substitute the present invention in various ways without departing from the essential characteristic of the present invention. Accordingly, the various embodiments disclosed herein are not intended to limit the technical spirit but describe with the true scope and spirit being indicated by the following claims. The scope of the present invention may be interpreted by the appended claims and the technical spirit in the equivalent range are intended to be embraced by the invention.

What is claimed is:

1. A method for image decoding that supports a plurality of layers, the method being performed by a decoding apparatus and comprising:
    decoding a picture of a first layer which a picture of a second layer including a current decoding target block refers to;
    mapping the picture of the first layer to a picture size of the second layer;
    configuring a first reference picture list for the picture of the second layer by adding the mapped picture of the first layer to a first predetermined position in the first reference picture list;
    configuring a second reference picture list for the picture of the second layer by adding the mapped picture of the first layer to a second predetermined position in the second reference picture list;
    generating prediction samples of the current decoding target block by predicting the current decoding target block of the second layer based on the first reference picture list and the second reference picture list to generate a prediction block;
    generating a residual block of the current decoding target block; and
    reconstructing the current decoding target block based on the prediction block and the residual block,
    wherein the first predetermined position is different from the second predetermined position, which is an end position in the second reference picture list.

2. The method of claim 1, wherein the mapping of the picture of the first layer comprises upsampling the picture of the first layer to the picture size of the second layer.

3. The method of claim 1, wherein the mapping of the picture of the first layer comprises mapping motion information of the picture of the first layer to the picture size of the second layer.

4. The method of claim 3, wherein the mapping of the picture of the first layer further comprises:
    dividing the picture of the second layer into N×N unit blocks;
    calculating a sample position of the first layer corresponding to one of the N×N unit blocks of the second layer including the current decoding target block; and
    determining motion information of the current decoding target block by mapping motion information of the sample position of the first layer to the N×N unit block of the second layer including the current decoding target block.

5. The method of claim 4, wherein the sample position of the first layer corresponds to a reference sample position in the N×N unit blocks of the second layer, and
    the N×N unit blocks are 16×16 unit blocks.

6. The method of claim 3, further comprising receiving information on the motion information mapping of the picture of the first layer in any one or any combination of any two or more of a video parameter set (VPS), a sequence parameter set (SPS), a picture parameter set (PPS), and a slice segment header.

7. The method of claim 3, further comprising using the mapped motion information of the first layer as a temporal motion vector candidate for the current decoding target block of the second layer.

8. The method of claim 1, wherein the generating of the prediction samples of the current decoding target block comprises using a first layer sample at a same position as the current decoding target block as a prediction sample of the prediction samples of the current decoding target block in response to a reference picture index of the current decoding target block indicating the mapped picture of the first layer in the first reference picture list or the second reference picture list.

9. An apparatus for image decoding that supports a plurality of layers, the apparatus comprising:
    one or more processors configured to:
    decode a picture of a first layer which a picture of a second layer including a current decoding target block refers to;
    map the picture of the first layer to a picture size of the second layer;
    configure a first reference picture list for the picture of the second layer by adding the mapped picture of the first layer to a first predetermined position in the first reference picture list;
    configure a second reference picture list for the picture of the second layer by adding the mapped picture of the first layer to a second predetermined position in the second reference picture list;
    generate prediction samples of the current decoding target block by predicting the current decoding target block of the second layer based on the first reference picture list and the second reference picture list to generate a prediction block;
    generate a residual block of the current decoding target block; and
    reconstruct the current decoding target block based on the prediction block and the residual block,
    wherein the first predetermined position is different from the second predetermined position, which is an end position in the second reference picture list.

10. A method for image encoding that supports a plurality of layers, the method being performed by an encoding apparatus and comprising:
    decoding a picture of a first layer which a picture of a second layer including a current encoding target block refers to;
    mapping the picture of the first layer to a picture size of the second layer;
    configuring a first reference picture list for the picture of the second layer by adding the mapped picture of the first layer to a first predetermined position in the first reference picture list;
    configuring a second reference picture list for the picture of the second layer by adding the mapped picture of the first layer to a second predetermined position in the second reference picture list;

generating prediction samples of the current encoding target block by predicting the current encoding target block of the second layer based on the mapped picture of the first layer to generate a prediction block;

generating a residual block of the current encoding target block based on the prediction block; and encoding the residual block, wherein the first predetermined position is different from the second predetermined position, which is an end position in the second reference picture list.

11. The method of claim 10, wherein the mapping of the picture of the first layer comprises upsampling the picture of the first layer to the picture size of the second layer.

12. The method of claim 10, wherein the mapping of the picture of the first layer comprises mapping motion information of the picture of the first layer to the picture size of the second layer.

13. The method of claim 12, wherein the mapping of the picture of the first layer further comprises:

dividing the picture of the second layer into N×N unit blocks;

calculating a sample position of the first layer corresponding to one of the N×N unit blocks of the second layer including the current encoding target block; and determining motion information of the current encoding target block by mapping motion information of the sample position of the first layer to the N×N unit block of the second layer including the current decoding target block.

14. The method of claim 13, wherein the sample position of the first layer corresponds to a reference sample position in the N×N unit blocks of the second layer, and the N×N unit blocks are 16×16 unit blocks.

15. The method of claim 12, further comprising transmitting information on the motion information mapping of the picture of the first layer in any one or any combination of any two or more of a video parameter set (VPS), a sequence parameter set (SPS), a picture parameter set (PPS), and a slice segment header.

16. The method of claim 12, further comprising using the mapped motion information of the first layer as a temporal motion vector candidate for the current encoding target block of the second layer.

17. The method of claim 10, wherein the generating of the prediction samples of the current encoding target block comprises using a first layer sample at a same position as the current encoding target block as a prediction sample of the prediction samples of the current encoding target block in response to a reference picture index of the current decoding target block indicating the mapped picture of the first layer in the first reference picture list or the second reference picture list.

18. An apparatus for image encoding that supports a plurality of layers, the apparatus comprising:

one or more processors configured to:

decode a picture of a first layer which a picture of a second layer including a current encoding target block refers to;

map the picture of the first layer to a picture size of the second layer;

configure a first reference picture list for the picture of the second layer by adding the mapped picture of the first layer to a first predetermined position in the first reference picture list;

configure a second reference picture list for the picture of the second layer by adding the mapped picture of the first layer to a second predetermined position in the second reference picture list; and generate prediction samples of the current encoding target block by predicting the current encoding target block of the second layer based on the mapped picture of the first layer to generate a prediction block;

generate a residual block of the current encoding target block based on the prediction block; and encode the residual block, wherein the first predetermined position is different from the second predetermined position, which is an end position in the second reference picture list.

19. A non-transitory computer-readable medium storing a bitstream generated by a method for image encoding that supports a plurality of layers, the method being performed by an encoding apparatus and comprising:

decoding a picture of a first layer which a picture of a second layer including a current encoding target block refers to;

mapping the picture of the first layer to a picture size of the second layer;

configuring a first reference picture list for the picture of the second layer by adding the mapped picture of the first layer to a first predetermined position in the first reference picture list;

configuring a second reference picture list for the picture of the second layer by adding the mapped picture of the first layer to a second predetermined position in the second reference picture list; and generating prediction samples of the current encoding target block by predicting the current encoding target block of the second layer based on the mapped picture of the first layer to generate a prediction block;

generating a residual block of the current encoding target block based on the prediction block; and encoding the residual block, wherein the first predetermined position is different from the second predetermined position, which is an end position in the second reference picture list.

* * * * *